(No Model.)

H. LEMP.
JOINT FOR CARBON FILAMENTS.

No. 410,168. Patented Sept. 3, 1889.

Witnesses,
Jas. J. Maloney.
M. E. Hill.

Inventor,
Hermann Lemp,
by Jos. P. Livermore
Att'y.

UNITED STATES PATENT OFFICE.

HERMANN LEMP, OF LYNN, MASSACHUSETTS, ASSIGNOR TO THE THOMSON-HOUSTON ELECTRIC COMPANY, OF CONNECTICUT.

JOINT FOR CARBON FILAMENTS.

SPECIFICATION forming part of Letters Patent No. 410,168, dated September 3, 1889.

Application filed September 17, 1888. Serial No. 285,644. (No model.)

*To all whom it may concern:*

Be it known that I, HERMANN LEMP, of Lynn, county of Essex, and State of Massachusetts, have invented an Improvement in Joints for Carbon Filaments and Similar Purposes, of which the following description, in connection with the accompanying drawings, is a specification, like letters on the drawings representing like parts.

My invention relates to a joint or connection between carbon or material having similar properties and other bodies, being shown as embodied in the joint between the leading-in wire and carbon filament of an incandescent lamp.

Considerable difficulty has been experienced in producing a strong and permanent mechanical union between the carbon filament and leading-in wires of incandescent lamps and at the same time affording a suitable electric connection between the carbon and conductors. Such joints have been made by producing a deposit of carbon at the point where the metallic conductor meets or abuts against the filament; but such deposit as usually applied does not afford a mechanically-strong union between the metal and carbon.

The present invention consists in a joint in which the carbon and body to be joined thereto are connected by a deposit formed mainly or wholly upon the carbon and extending outward therefrom, so as to embrace a portion of the other body, which preferably surrounds or nearly surrounds the part of the carbon on which the deposit is made.

In another application, Serial No. 275,637, dated May 31, 1888, I have illustrated and described a process or method of connecting carbon with other bodies which may be employed to produce the joint forming the subject of the present invention.

Figure 1:
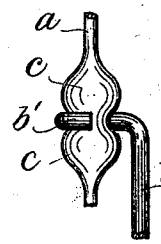
Figure 2:
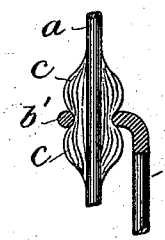
Figure 3:
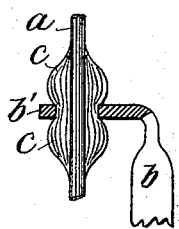
Figure 4:
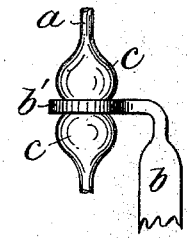
Figure 5:
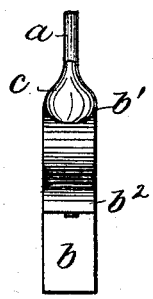
Figure 6:
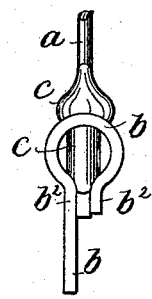

Figure 1 is a side elevation of a joint between one end of a carbon filament and a metallic conductor or leading-in wire embodying this invention; Fig. 2, a longitudinal section thereof; Figs. 3 and 4, similar elevations showing a modified construction of the joint; Figs. 5 and 6, elevations at right angles to one another of another modification, and Fig. 7 a longitudinal section of the joint shown in Figs. 5 and 6.

The carbon $a$ and the body $b$ to be united therewith by the joint forming the subject of this invention may be the carbon filament and metallic conductor or leading-in wire of an incandescent electric lamp; but a joint of the same kind may be employed to unite mechanically the piece of carbon $a$ with a body $b$, which is not necessarily a conductor of electricity, as there is nothing in the joint itself or in its mode of production which necessitates that the body $b$ should be a conductor. The body $b$ to be united with the carbon in accordance with this invention has a portion $b'$ which preferably surrounds or nearly surrounds the part of the carbon $a$ to be united to it, and lies mainly in a plane transverse or substantially at right angles to the axis of the carbon, having, for example, as shown in Figs. 1 and 2, a loop or eye formed in the end of a wire, or, as shown in Figs. 3 and 4, being a portion of a flat strip having an opening through which the carbon $a$ passes, so that the said portion $b'$ of the strip surrounds the carbon. The portion $b'$ is fastened to and securely joined with the portion $a$ by the deposit $c$ of carbon upon the part $a$, which deposit extends outward from the said part $a$, so as to engage and fill the said part $b'$ of the body $b$ adjacent to the said filament $a$. The deposit $c$ makes an enlargement upon the filament $a$ at either side of the part $b'$, and thus fastens the parts $a$ and $b$ together wholly independently of any adhesion which may exist between the material of the deposit and of the body $b$, although as a matter of fact, when, as is usually the case, the said body $b$ is a metallic conductor, there is a strong adhesion between the body and such conductor.

Figure 7:
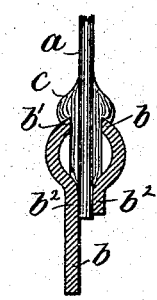

In the modification shown in Figs. 5, 6, and 7 the part $b$, besides having the portion at $b'$, that surrounds or embraces the filament $a$, also has portions $b^2$, that embrace the filament $a$ below the deposit $c$, a portion of which deposit lies between the part $b'$ of the body $b$ and the parts $b^2$, that lie against the filament.

It is not essential that the portion $b'$ of the body to be connected with the carbon should extend wholly around the carbon, as the deposit will engage and embrace the said portion $b'$ if it be opposite or adjacent to an intermediate portion of the part of the carbon $a$ on which the deposit is made; and it is extremely desirable that the body $b$ should have portions at opposite sides of the carbon $a$, as shown, so that the deposit will enter between the said opposite portions of the body connected by it with the carbon.

I claim—

The carbon filament and body joined thereto, and a deposit on said filament interposed between the said filament and body, which are out of contact with one another, but connected by the said intervening deposit, substantially as described.

In testimony whereof I have signed my name to this specification in the presence of two subscribing witnesses.

HERMANN LEMP.

Witnesses:
E. WILBUR RICE, Jr.,
J. W. GIBBONEY.